July 11, 1967  W. SEABLOM  3,330,928
MERCURY SWITCH

Filed July 29, 1963  4 Sheets-Sheet 1

INVENTOR
WENDELL SEABLOM
BY Flehr and Swain
ATTORNEYS

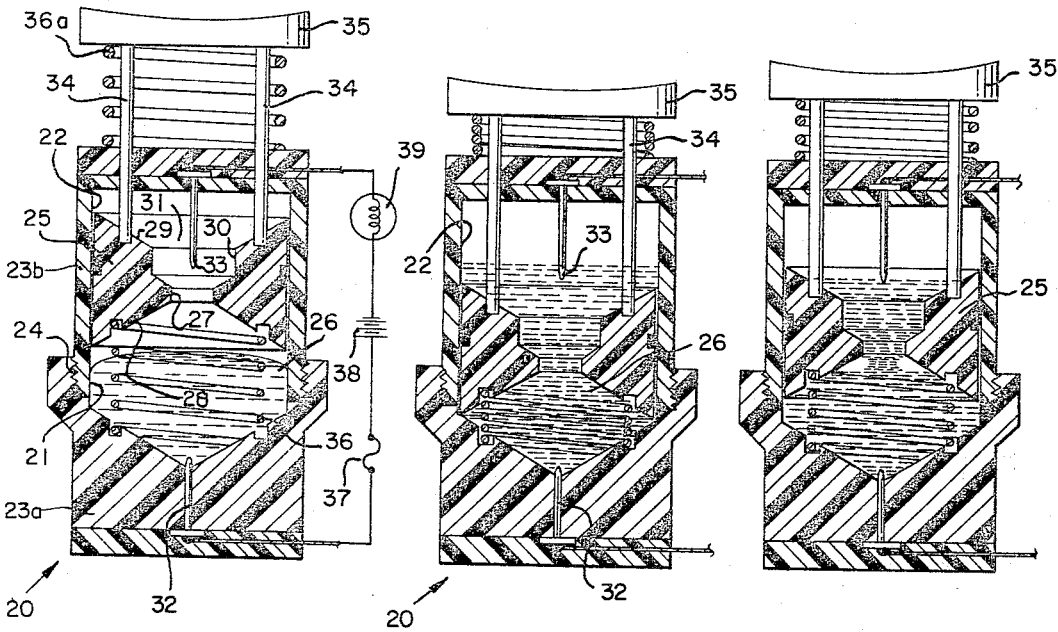
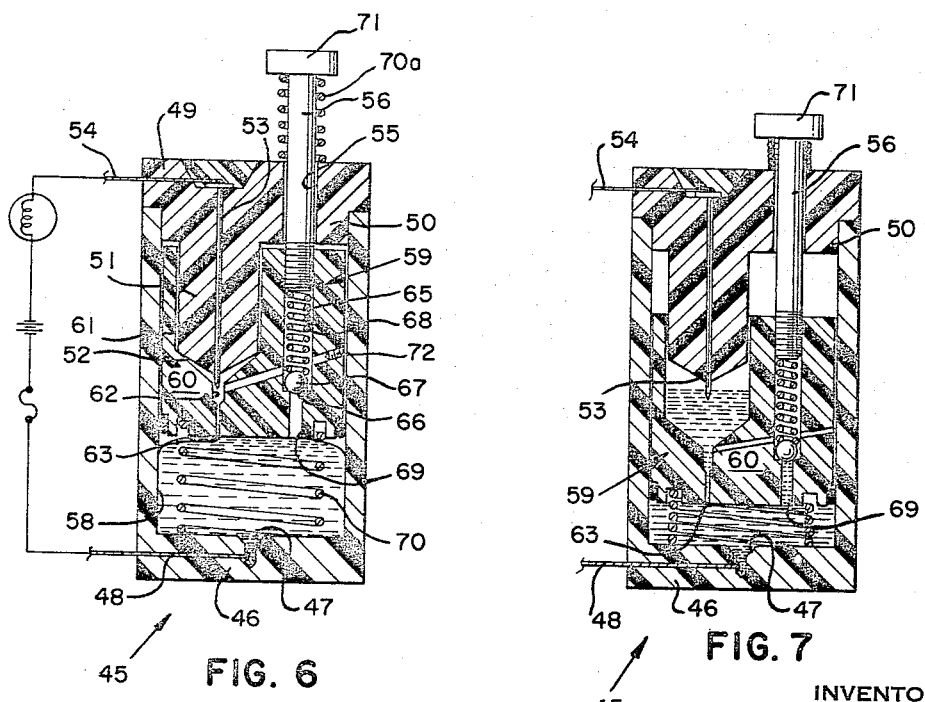

July 11, 1967

W. SEABLOM 3,330,928

MERCURY SWITCH

Filed July 29, 1963

INVENTOR.
WENDELL SEABLOM
BY
*Flehr and Swain*
ATTORNEYS

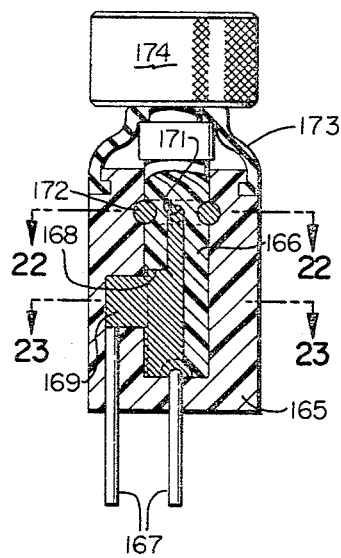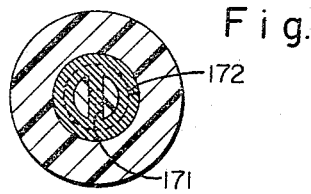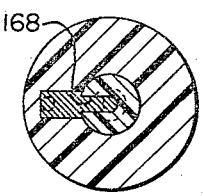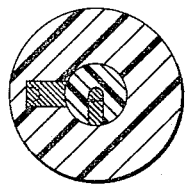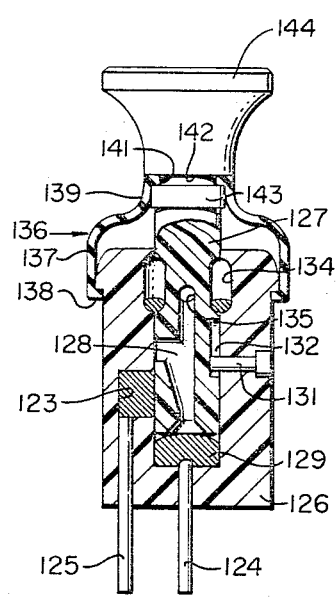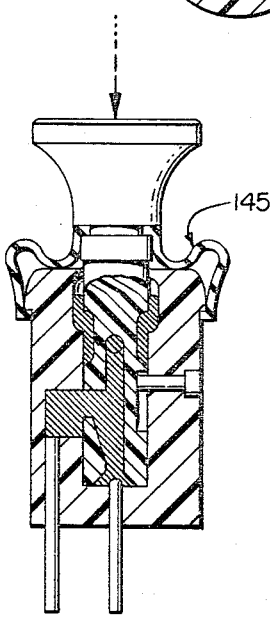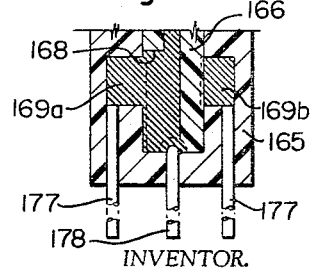

200—152)

United States Patent Office 3,330,928
Patented July 11, 1967

3,330,928
MERCURY SWITCH
Wendell Seablom, 3712 Texas Drive,
Santa Rosa, Calif. 95405
Filed July 29, 1963, Ser. No. 298,389
10 Claims. (Cl. 200—152)

This application is a continuation-in-part of copending application Ser. No. 259,987, filed Feb. 20, 1963, now abandoned.

This invention relates to electrical switches and more particularly to an improved mercury switch.

Mercury switches have long been known to possess advantageous features over other types of electrical switches. For example, arcing is virtually eliminated by using mercury switches. In conventional mercury switches the mercury is ordinarily carried in a tiltable container. Two electrodes extend into the container. When the container is tipped, the electrodes are carried below the liquid level of the mercury to complete an electrical path between the two via the mercury. This type of bi-stable mercury switch is not entirely suitable for use in applications such as airplanes and ships. The mercury can too easily be washed onto the electrodes accidentally.

In general it is an object of this invention to provide an improved mercury switch.

It is another object of the invention to provide a mercury switch wherein the interconnection mercury is forced positively into contact with the electrodes.

Another object of the invention is to provide a mercury switch usable in a variety of orientations whereby it is adapted for use in moving vehicles such as aircraft and the like.

Yet another object of the invention is to provide a mercury switch which can be turned "on" and which will automatically be turned "off" after a predetermined interval, thereby providing a monostable switch incorporating a predetermined time delay.

A further object of the invention is to provide a bi-stable mercury switch usable in a variety of orientations wherein the interconnecting mercury is positively carried into contact with the electrodes.

A still further object of the invention is to provide a mercury switch having means for selectively interconnecting one of a plurality of electrodes through the mercury to a source of potential.

Another object of the invention is to provide a mercury switch wherein a cylindrical core containing mercury can be moved to cyclically make and break electrical contact with two or more electrical contact points.

A more particular object of the invention is to provide a mercury switch device whereby one of a plurality of impedances can be selectively interposed in an electrical circuit.

Other objects of the invention will become apparent from the following detailed description of a preferred embodiment when considered together with the accompanying drawings in which:

FIGURES 3 through 5 show the sequence of operation of a mercury switch according to another embodiment of the invention including means for automatically opening the switch after a predetermined interval of operation;

FIGURES 6 and 7 show the operation of another embodiment of a mercury switch having means for automatically opening the switch after a predetermined interval of operation;

FIGURES 19 and 20 show another embodiment employing a recess filled with mercury as a stationary contact point;

FIGURES 21 through 24 show another embodiment of the invention wherein rotary components are employed; and FIGURE 25 shows a switch similar to that shown in FIGURES 21 through 24 but with multiple contacts, suitable for use in an alternator.

In general, there is provided a switch comprising means forming a sealed, expansible reservoir having a variable volume and adapted to hold a predetermined volume of mercury. A pair of spaced electrodes are carried by the reservoir-forming means whereby electricity can be conducted between the electrodes through the mercury when the volume of the reservoir is reduced. Means are provided for temporarily reducing the volume of the reservoir in order to force the mercury positively into contact with both electrodes thereby completing an electrical circuit between the electrodes.

Figure 1:
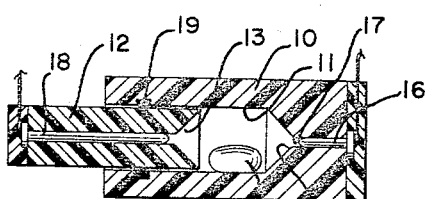
FIGURES 1 and 2 show a mercury switch in accordance with the invention, respectively in open and closed circuit condition.
Figure 2:
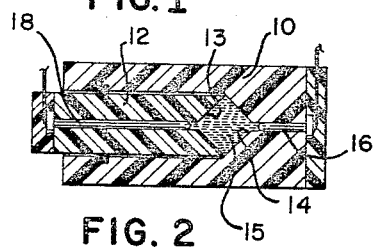

Referring to FIGURES 1 and 2 the means forming a sealed expansible reservoir of variable volume includes a body member 10 having a generally hollow interior 11. A plunger 12 is arranged to be moved between advanced and retracted positions within interior 11. Body member 10 and plunger 12 are made of a suitable insulating material. Axially opposed conical surfaces 13, 14 are formed respectively on the inner end of plunger 12 and at the closed end of interior 11.

A pair of spaced electrodes are carried in the switch whereby compression of plunger 12 into interior 11 serves to force a predetermined volume of mercury 15 into contact with both the electrodes. One electrode 16, soldered to an electrical lead, is inserted in a hole 17 drilled into the apex of surface 14. Electrode 16 is retained in hole 17 by a layer of plastic material potted onto the end of body member 10. Another electrode 18, likewise soldered to an electrical lead, is carried coaxially of plunger 12. Mercury 15 is held sealed within the reservoir formed by interior 11, and surfaces 13, 14 by the O-ring seal 19, although the latter is not entirely necessary where a reasonably snug fit is provided. The non-wettable nature of the plastic and large molecular construction of mercury serves to reject the mercury so as to prevent its escape.

Accordingly, when plunger 12 is driven into the reservoir so as to reduce the volume thereof the mercury is forced positively into contact with the exposed tips of electrodes 16, 18 to form a connection between the two electrical leads. Plunger 12 is resiliently urged to return to open circuit condition as shown in FIGURE 1 by the compression of the entrapped air within the reservoir, as well as by the relative buoyancy of the plastic material compared to that of mercury, where for example, polyethylene is used for the plunger.

Figure 13:
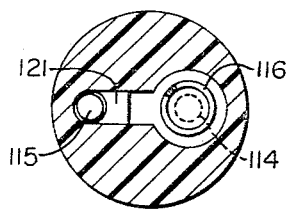
FIGURES 12 and 13 show another embodiment of the invention wherein the contact points are protected against erosion by immersion in mercury.

Contact points can be further protected against arcing and erosion by retaining them immersed in a body of mercury substantially at all times. Means serving to make and break a conductive path of mercury between the deposits of mercury surrounding the contacts then serves to control the switch on a mercury to mercury basis. Accordingly, referring to FIGURES 12 and 13, a switch is shown having a body 110 defined by a pair of body members 110a, 110b to form a hollow cylindrical interior forming a reservoir 111. The volume of reservoir 111 varies with the displacement of a plunger 113 movable between advanced and retracted positions within reservoir 111. A pair of spaced electrodes 114, 115 are carried by the body in a manner disposing an end of each to make electrical contact therebetween via displaced mercury under compression of plunger 113. Thus, a recess in the form of a pocket 117 is formed in body 110 and adapted to continuously hold a deposit of mercury, for example up to the level of line 118. The upper end of electrode 115 is thereby disposed to be immersed continuously in a protective covering of mercury whereby advancing plunger 113 serves to displace mercury from reservoir 111 via a fluid channel 119, and into conductive contact with mercury retained in pocket 117. The other electrode is disposed with an end extending into contact with the interior of reservoir 111. Plunger 113 is moved to its retracted position by the differential in buoyancy between the material of the plunger and that of the mercury. A spring 116 can be provided, however, to aid in aligning and "steering" the plunger so as to provide a better feel to the switch.

Figure 12:
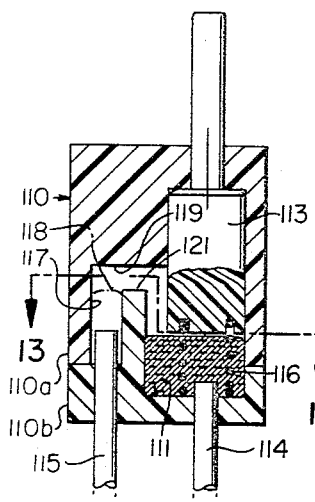

Pocket 117, as shown in FIGURE 12, is separated from reservoir 111 by a sill 121, above which the mercury must rise to make contact with mercury in the pocket. It has been found that mercury can also be entrapped in a recess, such as 123 (FIGURE 19) and retained continuously therein merely by causing the side wall of the plunger to wipe across the open side of the recess 123 while maintaining a pressure head of mercury applied thereto. This works particularly well with non-wettable plastics or with glass. Recess 123 is shown embodied in a bi-stable plunger actuated switch now to be described with particular reference to FIGURES 19 and 20.

The bi-stable switch shown in FIGURE 19 includes a pair of spaced electrodes 124, 125 carried by the body member 126. Body member 126 is formed with a cylindrical interior to receive a plunger 127 therein. Plunger 127 is provided with a fluid passage 128 extending lengthwise thereof whereby downward movement serves to displace mercury from a deposit or reservoir 129 of mercury and make electrical contact with a protective deposit of mercury retained in recess 123. Means maintaining alignment of passage 128 with recess 123 includes the key and keyway 131, 132.

Means serving to maintain a liquid pressure head of mercury upon recess 123 includes an annular reservoir 134 formed between the plunger and the body member and adapted to continuously retain mercury in order to provide a fluid seal between the interior of body member 126 and the surrounds. The annular reservoir 134 is in fluid communication with reservoir 129 and disposed to replenish same should any mercury be lost from reservoir 129. Thus fluid passage 128 continues further upwardly of plunger 127 and includes a channel 135 disposed transversely of plunger 127.

Means imparting a bi-stable operation to plunger 127 to positively hold the plunger in each of two positions includes a hollow resilient member 136, of suitable material such as rubber, silicone-rubber or the like, and formed to include a bell-shaped portion 137 having a large opening at the bottom formed with a rib 138 adapted to receive and engage a flanged portion of the body member. Member 136 includes a neck portion 139 at the top having a smaller opening adapted to receive and engage the plunger by means of a rib 141 received by an annular groove 142 formed around plunger 127 between a collar 143 and push-button 144. Neck portion and bell portion 139, 137 respectively merge into each other in an S-shaped curve and the degree of resilience of member 136 serves to permit one end of member 136 to be moved toward the other and form a folded-over lobe portion 145 having a reverse curve configuration serving to retain the top and bottom ends in a stable proximate relation. As shown in FIGURE 20, movement of plunger 127 to its advanced position serves to substantially fill the voids formed in body member 126 and plunger 127. Movement of plunger 127 to its retracted position reduces the volume of mercury in annular reservoir 134 to a level defined by the sill of opening 135. The sill of opening 135 is disposed above the bottom of reservoir 134 to insure that mercury will be continuously present to form a seal around the plunger.

According to another embodiment of the invention a monostable switch having a built-in time delay is provided as best shown in FIGURES 3 through 5.

In general, the switch comprises means forming an expansible reservoir of variable volume adapted to hold a predetermined volume of mercury. A temporary holding chamber for receiving the mercury is provided together with fluid passage means interconnecting the reservoir to the temporary holding chamber. Resilient means are provided, including a piston, operable to displace a portion of the volume of mercury in the reservoir in order to transfer mercury to the temporary holding chamber. When mercury transfers to the temporary holding chamber an electrical path is completed from one of two electrodes to the other.

Means forming an expansible reservoir 21 and a temporary holding chamber 22 includes a cylindrical container 23 formed by a male and female half, 23a, 23b, respectively, adapted to be screwed together by threads 24. The interior of container 23 is separated into reservoir 21 and temporary holding chamber 22 by a movable piston 25 operable to be moved between advanced and retracted positions into and out of a deposit of mercury 26 in reservoir 21.

A fluid passage means serving to transfer mercury 26 from reservoir 21 to temporary holding chamber 22 comprises port 27 extending through piston 25. One end 28 of piston 25 is formed with a conical surface forming one wall of reservoir 21. The other end 29 of piston 25 forms a wall of chamber 22. End 29 is formed with a portion including bowl 30, which serves to reduce the lateral confines of the displaced mercury thereby elongating the volume of the displaced mercury in a direction axially of container 23. It is to be noted that the displaced mercury therefore extends axially to a greater degree in the temporary holding chamber than in the reservoir. End 29 further includes a conical draining surface 31. Accordingly, elongation of the mercury path between a pair of spaced electrodes 32, 33 coaxially carried in opposed relation by container 23. Electrode 33 extends into bowl 30 whereby downward displacement of piston 25 into mercury 26 serves to virtually immediately interconnect electrodes 32, 33 via mercury 26.

Means for moving the piston 25 into and out of the mercury in order to transfer mercury between the reservoir and temporary holding chamber includes the connecting rods 34. Rods 34 are anchored at their lower ends in piston 25 and at their upper ends in a button 35. A main spring 36 in reservoir 21 and an auxiliary spring 36a disposed between the upper end of container 23 and button 35 serve to resiliently urge piston 25 in a direction tending to expel mercury from temporary holding chamber 22.

Operation of the embodiment is best described commencing with reference to the position of piston 25 in FIGURE 3. An illustrative electrical circuit, as shown, may include electrode 33, a fuse 37, a power supply such as battery 38, a load such as lamp 39, and electrode 33. In the condition shown in FIGURE 3, button 35 is in its upward position and mercury 26 is in electrical contact with electrode 32 only. The predetermined volume of mercury 26 is insufficient to provide electrical contact between electrodes 32 and 33 in any orientation of switch 20. By depressing button 35 its fullest extent (FIGURE 4), piston 25 is moved to its advanced position. Mercury rises, as shown, via port 27 into temporary holding chamber 22. After an initial downward movement of piston 25, the mercury has risen to a level forming an electrical contact with electrode 33 to complete the circuit through lamp 39. The laterally confining nature of bowl 30 serves to quickly extend the volume of displaced mercury axially along switch 20. When button 35 is released piston 25 is urged by springs 36 and 36a to force mercury to drain through port 27 (FIGURE 5) into reservoir 21. After substantially complete drainage the circuit will be broken. The interval during which the circuit is closed will be dependent upon the diameter of port 27 and the force of spring 36. Where an extended interval of time is desired, the size of port 27 will be quite small. However, as port 27 is made smaller, the longer it will take to "close" the switch inasmuch as the transfer of mercury from reservoir 21 to chamber 22 is likewise restricted by port 27.

According to another embodiment of the invention a switch is provided employing fluid passage means formed whereby the resistance to fluid flow is less in a direction leading into the temporary holding chamber 22 than out of chamber 22. In general, this embodiment includes both a constricting orifice for draining liquid from the temporary holding chamber to the reservoir and a port disposed to by-pass the orifice and formed to inhibit fluid flow from the temporary holding chamber to the reservoir.

Figure 10:
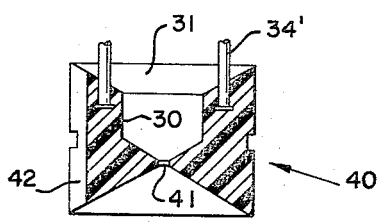
FIGURES 10 and 11 show a piston for use in a further embodiment of the invention wherein a constriction and by-pass are employed.
Figure 11:
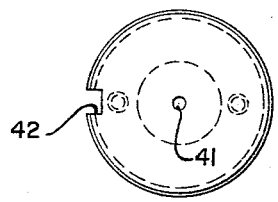

A piston 40 can thus be employed in the structure of FIGURE 3 to function in the foregoing manner (FIGURES 10 and 11). A constricting orifice 41 and a by-pass port 42 extend through piston 40. Port 42 is disposed at the edge or other high point of piston 40 to inhibit return drainage. Thus, the upper end of port 42 enters temporary holding chamber 22 at the highest point on drainage surface 31'. Accordingly, as soon as the level of mercury in the temporary holding chamber drops below the edge of the upper end of port 42, drainage will be entirely via constricting orifice 41. If desired, the upper end of port 42 can be further extended upwardly by forming the upper end of piston 40 with a sill around the upper edge of port 42 and extending axially as desired.

In applications where gravity is not to be relied upon to return the mercury to its reservoir, a ball check valve or other positive acting means should preferably be incorporated, such as shown in FIGURES 6 and 7.

The switch 45 includes an open cylindrical container 46 including a small depression 47 in the bottom thereof. An electrode 48 extends into depression 47 for contact with mercury therein.

Means forming a cap assembly closes the top of container 46. The cap assembly includes a cap member 49 having a cylindrical portion 50. Portion 50 fits into the top of container 46 to seal the same. Portion 50 is formed with a cylindrically shaped depending portion 51 having a conically shaped surface 52 at its free end. Portion 51 is carried eccentrically with respect to the axis of container 46. Cap member 49 further includes an electrode 53 connected to a lead 54, as by soldering, and carried coaxially of portion 51. Cap member 49 further includes a drilled hole 55 extending therethrough.

Means are provided for positively displacing mercury from a reservoir thereof to a temporary holding chamber and for positively draining mercury from the temporary holding chamber back to the reservoir thereby providing a monostable switch having a predetermined time delay. Fluid passage means are also provided wherein resistance to fluid flow from the temporary holding chamber to the reservoir is greater than from the reservoir to the temporary holding chamber. Thus, a plunger assembly 59 includes a generally cylindrically shaped piston 60 formed with a longitudinally extending well 61 disposed to loosely receive portion 51. The top of well 61 is therefore substantially closed by surface 52. The bottom of well 61 includes a coaxially formed cylindrical passage 62 and a constricting orifice 63. A passage 64 is disposed upwardly at an angle to passage 62 and extends to the periphery of piston 60. Passage 64 intercepts a cylindrical cavity 65, the bottom end of which is formed with a conical seating surface 66 for a ball check valve 67 retained seated by a spring 68. A relatively large port 69 leads into the bottom of cavity 65 and by-passes orifice 63 to pass mercury from reservoir 58 beneath piston 60 to well 61 via passage 64.

Means for moving piston 60 between advanced and retracted positions into and out of mercury disposed in reservoir 58 includes a stem 56, threadedly engaged in the upper end of cavity 65 and spring loaded upwardly by springs 70 and 70a.

Operation of switch 45 is effected by depressing button 71 to move piston 60 into the mercury in reservoir 58. By forcing piston 60 into reservoir 58, the mercury moves via port 69 and orifice 63 into passages 62, 64, cavity 65, and well 61. A temporary holding chamber can, therefore, be considered to include all the foregoing spaces. If desired, the end of passage 64 can be closed by a plug 72, although piston 60 can fit snugly enough within container 46 to seal passage 64 without interfering with the operation of the switch. In its fully advanced position, piston 60 displaces mercury to a level as shown schematically in FIGURE 7. Release of button 71 serves to permit springs 70 and 70a to force mercury back to reservoir 58 via orifice 63. The dimension of orifice 63 and force of springs 70 and 70a, therefore, establish a predetermined time interval during which the electrodes 53, 48 are electrically connected via the displaced mercury.

Figure 8:
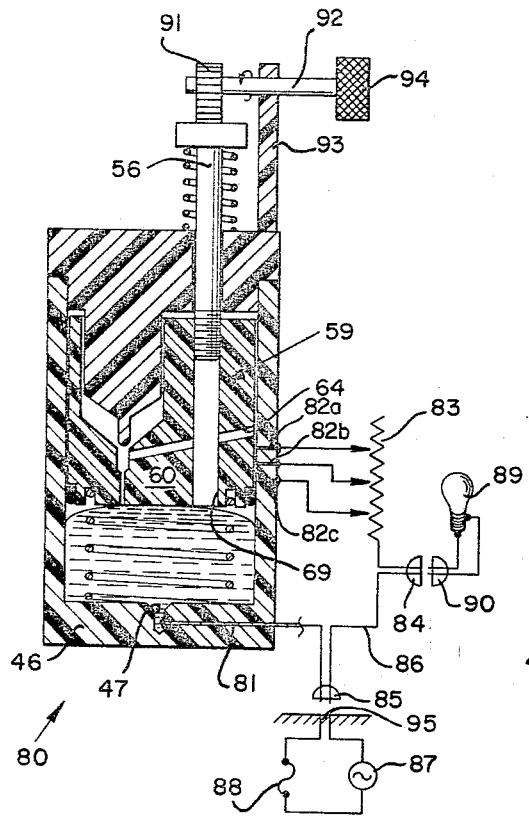
FIGURES 8 and 9 show the operation of yet another embodiment of a mercury switch having means for selectively establishing one of a plurality of electrical circuits.
Figure 9:
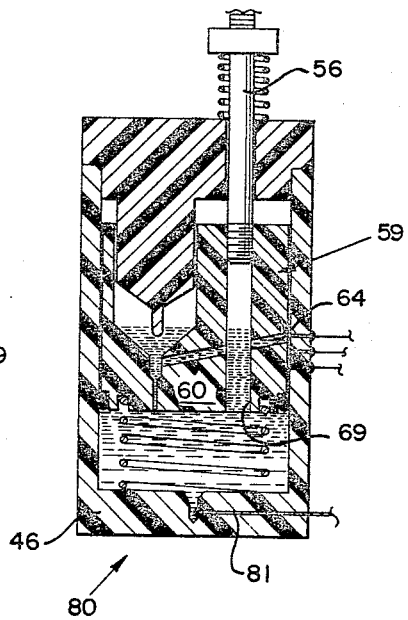

Referring to FIGURE 8, there is shown another embodiment wherein a mercury switch device is provided having means for selectively interconnecting one of a plurality of electrodes through the mercury to a source of potential. As will be apparent from the following description the apparatus of FIGURES 8 and 9 provides a switching unit 80 whereby one of a plurality of impedances can be selectively interposed in an electrical circuit to operate equipment at one of several voltages.

The similarity between the apparatus of FIGURE 8 and that shown in FIGURE 6 will be readily apparent and repetition of the features thereof at this time is not considered necessary. In addition to an electrode 81 disposed in depression 47 there is provided a plurality of three conductive contacts 82a, 82b, and 82c, each of which extend through the side wall of container 46. Contacts 82 are disposed in alignment with the open end of passage 64 whereby mercury entering via port 69 serves to connect electrode 81 therewith. Each of contacts 82 is arranged to tap into an impedance element, such as a resistor 83 connected to one side of a female plug 84. Electrode 81 is connected to one side of male plug 85 and the other sides of plugs 84, 85 are interconnected by a lead 86.

To operate the mercury switching unit 80, plug 85 can, for example, be inserted into a wall plug 95 as found in a house wiring circuit including a power supply 87 and a fuse or circuit breaker 88. A lamp 89 including a plug 90 can then be inserted into plug 84. As thus arranged unit 80 is readily electrically interposed conveniently between the load circuit and the power circuit. The entire circuitry is energized when plunger 60 is depressed. This complete circuit can be traced as follows: Power supply 87, fuse 88, electrode 81, the mercury in passage 64 (via port 69), a selected one of contacts 82, resistance element 83, one side of plug 84 to lamp 89 and return via plug 90, the other side of plug 84, lead 86, and then return to power supply 87. The degree of displacement of piston 60 serves to select one of a plurality of contacts 82.

Means for positively displacing piston 60 to a selected degree include an eccentric 91 rotated by a shaft 92 carried by a fixed member 93. A knurled knob 94 is supported on the end of shaft 92. Rotation of knob 94 serves to operate eccentric 91 to displace stem 56 positively moving piston 60 into and out of the mercury. In unit 80, as positively driven by eccentric 91, ball check 67 can be removed as shown.

It will be readily evident from the foregoing description of unit 80 that a mercury controlled switch is provided whereby a single element light bulb, for example, can be controlled at any one of several levels of illumination without the need to provide its own built-in extra filaments. Other uses and adaptations of device 80 will, of course, occur to those skilled in the art.

Figure 17:
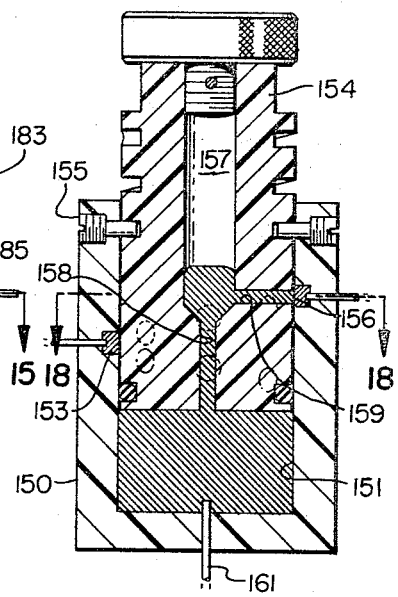
FIGURES 16 through 18 show another embodiment of the invention wherein the plunging action is accomplished by rotary components.
Figure 16:
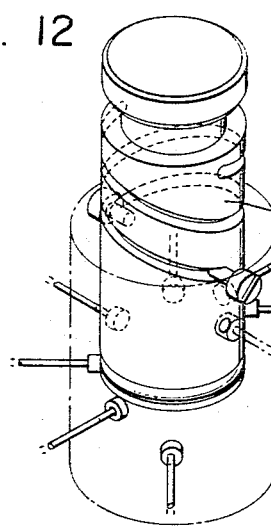
Figure 18:
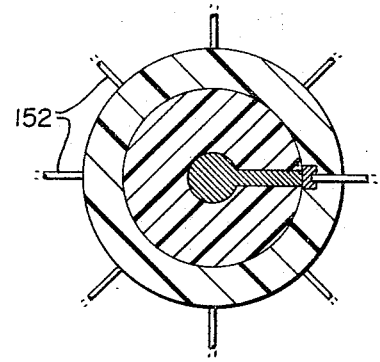

The axial plunging action described above can also include rotational components of movement as in the embodiment shown in FIGURES 16 through 18. The switch shown in FIGURES 16 through 18 comprises a body member 150 of insulating material preferably of a non-wettable plastic. Member 150 includes a hollow cylindrical interior 151 forming a reservoir adapted to hold a deposit of mercury. A plurality of electrodes 152 are carried by body member 150 with one end of each being disposed in a predetermined spiral path and exposed to the interior of the body member. The electrode ends are submerged in mercury as by being received in recesses 153 adapted to retain mercury. A plunger 154 is snugly and slidably received by the body member and threadedly engaged, as by a pair of radially projecting screws 155 carried at the top of the body member. Thus plunger 154 is arranged to be screwed to move between advanced and retracted positions. The main body of mercury below plunger 154 is connected by a fluid path to a port 156 adapted to travel the spiral path defined by electrodes 152. A temporary holding chamber 157 is defined in plunger 154 and serves to receive mercury displaced by advancing movement of the plunger. A fluid path 158, 159 extends between the reservoir and port 156 so as to connect the port to a liquid pressure head of mercury applied from temporary holding chamber 157, whenever port 156 is disposed to provide electrical contact with any of electrodes 152. A common electrode 161 is disposed at the bottom of body member 150 to remain in continuous electrical contact with the mercury in the reservoir whereby spiral movement of plunger 154 serves to electrically interconnect electrode 161 selectively to any of electrodes 152 via mercury in the reservoir and fluid path.

The topmost recess 153 is disposed below the level of mercury in holding chamber 157 so as to insure a liquid pressure head and supply of mercury to continuously maintain the ends of electrodes 152 immersed in a protective deposit of mercury which insures against arcing at the contacts.

Rotary movement of the plunger to selectively make connection with circumferentially disposed contacts is further embodied in structure now to be described. Thus as shown in FIGURE 21 there is provided a switch comprising a body member 165 having a hollow cylindrical interior. A core member 166 is disposed to rotate coaxially in the interior and be snugly received therein. A pair of electrodes 167 are disposed with an end of each in fluid communication with the interior of body member 165. For example, the end of one electrode can enter coaxially of the bottom and the other be retained in a recess 169 at the side. An opening 168 is formed in core member 166 and serves to define a fluid path between electrodes 167 at a given rotational disposition of core member 166 (FIGURE 23). Opening 168, being filled with mercury, therefore makes electrical interconnection between electrodes 167.

Means serving to apply a fluid pressure head to mercury in opening 168 and recess 169, until the fluid path is substantially entirely interrupted between electrodes 167 includes the axially bored upper end of opening 168 which connects via a transverse channel 171 to an annular reservoir 172. Reservoir 172 encircles core member 166 at a position above the level of recess 169.

Although it has been found that a snug sliding fit between core member 166 and body member 165 when made from a non-wettable material such as many of the common plastics, serves to provide a most adequate sealing of the mercury in the switch, further protection against any possible leakage can include a resilient cap member 173 similar to resilient member 136 described in FIGURE 19. Member 173 is carried at its lower end by an annular groove in body member 165 and at its upper end in an annular groove formed between a collar and a knurled knob 174. In operation, rotation of knob 174 serves to align opening 168 with recess 169 thereby making a mercury to mercury contact between electrodes 167.

Where an alternator is desired, according to another embodiment of the invention, corresponding in many respects to the bi-stable switch shown in FIGURE 21, a pair of electrodes 177 can be provided with a common electrode 178 adapted to make electrical contact through the mercury alternately to electrodes 177. Thus core member 166 can be continuously driven in one direction and opening 168 will serve to carry mercury alternately to recess 169a and recess 169b.

Figure 15:
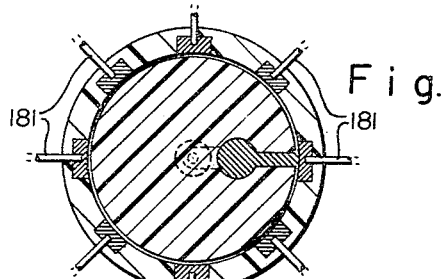
FIGURES 14 and 15 show a multiposition switch in accordance with the invention wherein rotary components are employed.
Figure 14:
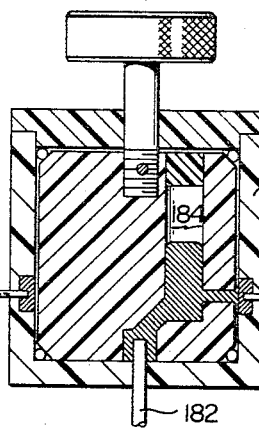

According to still another embodiment of the invention, as shown in FIGURES 14, 15, a series of electrodes 181 are adapted to be selectively coupled to a common electrode 182 carried in the base of a body member 183 in the manner described with respect to FIGURE 21. A temporary holding chamber 184 serves to maintain a liquid pressure head on port 185 arranged to contact each of electrodes 181 and make fluid contact therewith. Thus a multipositional switch is provided as shown in FIGURE 14 for making electrical connection to any one of a series of electrodes.

I claim:

1. A switch comprising means forming a closed, hollow cylinder, a movable piston separating said cylinder into a temporary holding chamber and an expansible reservoir adapted to hold mercury, one end of said piston forming a wall of said temporary holding chamber and the other end forming a wall of said reservoir, fluid passage means for transferring said mercury from said reservoir to said temporary holding chamber and for draining the transferred mercury back to said reservoir, said piston being operable to be moved into said mercury in the reservoir to displace a volume thereof thereby transferring a portion of said mercury to said temporary holding chamber, the first named end of said piston including a portion of serving to reduce the lateral confines of the displaced mercury to extend the volume thereof in a direction axially of said cylinder to a greater degree in said reservoir the laterally confining portion of the first named end of said piston including an elongated bowl disposed to receive the displaced mercury means for moving said piston into and out of said mercury to transfer same via said fluid passage means between said reservoir and said temporary holding chamber, a pair of spaced electrodes disposed to conduct electricity therebetween via said mercury when said piston is moved to displace said mercury from said reservoir, one of said electrodes being carried to extend into said bowl, and said fluid passage means being formed to fill and drain said bowl responsive to movement of said piston, said fluid passage means including a constricting orifice for draining liquid from said bowl to said reservoir, and a port disposed to by-pass said orifice, said port being disposed and formed to inhibit drainage via said orifice, from said bowl to said reservoir.

2. A switch comprising means forming a closed, hollow cylinder, a movable piston separating said cylinder into a temporary holding chamber and an expansible reservoir adapted to hold mercury, one end of said piston forming a wall of said temporary holding chamber and the other end forming a wall of said reservoir, fluid passage means for transferring said mercury from said reservoir to said temporary holding chamber and for draining the transferred mercury back to said reservoir, said piston being operable to be moved into said mercury in the reservoir to displace a volume thereof thereby transferring a portion of said mercury to said temporary holding chamber, the first named end of said piston including a portion serving to reduce the lateral confines of the displaced mercury to extend the volume thereof in a direction axially of said cylinder to a greater degree in said temporary holding chamber than in said reservoir, the laterally confining portion of the first named end of said piston including an elongated bowl disposed to receive the displaced mercury, means for moving said piston into and out of said mercury to transfer same via said fluid passage means between said reservoir and said temporary holding chamber, and a pair of spaced electrodes disposed to conduct electricity therebetween via said mercury when said piston is moved to displace said mercury from said reservoir, one of said electrodes being carried to extend into said bowl, said fluid passage means being formed to fill and drain said bowl responsive to movement of said piston, and to pass mercury into said bowl with less flow resistance than to drain mercury out of said bowl, said fluid passage means extending through said piston and including a drainage orifice interconnecting said bowl and said reservoir, and a check valve disposed to pass fluid via said port in a single direction leading from said reservoir into said bowl.

3. A switch comprising means forming a closed container, a piston within said container to define a fluid reservoir adapted to hold mercury and a temporary holding chamber, fluid passage means interconnecting said temporary holding chamber and said reservoir for transferring mercury from said reservoir to said temporary holding chamber and for draining the transferred mercury back to said reservoir, said piston being operable to be moved into said mercury in the reservoir to displace a volume thereof to transfer same to said temporary holding chamber, means formed in said temporary holding chamber serving to reduce the lateral confines of the displaced mercury to elongate said volume in a direction axially of said container to a greater degree in said temporary holding chamber than in said reservoir, means for moving said piston into and out of the mercury in said reservoir to transfer same between said reservoir and said temporary holding chamber, a first electrode penetrating into said reservoir and adapted to be connected to a source of potential, a plurality of second electrodes carried by the container, and means responsive to movement of said plunger displacing a portion of said mercury to selectively connect said first electrode via said displaced mercury to a selected one of said second electrodes, to the exclusion of the others.

4. A switch comprising means forming a sealed reservoir having a variable volume and adapted to hold a predetermined volume of mercury, said means including a body member having a hollow cylindrical interior and a plunger movable between advanced and retracted positions within said interior, a pair of spaced electrodes carried by said means to dispose an end of each to conduct electricity therebetween via said mercury when the volume of the reservoir is reduced, a recess formed in the interior of the body member to extend generally radially of said interior and into said body, said plunger being snugly and slidably disposed in said body member and being further formed to include a lengthwise passage, disposed to open at one end into said reservoir and a connecting channel at the other end extending transversely to the peripheral surface of the plunger, said channel being aligned and disposed to form a fluid path of mercury to said recess from said reservoir via said passage when said plunger is moved to said advanced position and to interrupt said path of mercury when moved to said retracted position, and means serving to retain a fluid pressure head applied, during the retraction movement, to mercury in said recess until said path is substantially entirely interrupted, whereby mercury to mercury contact between said electrodes is maintained.

5. A switch as defined in claim 4 wherein the last named means includes an annular reservoir extending around said plunger between the plunger and said body member and adapted to continuously retain mercury therein to form a fluid seal between said interior and the surrounds, said annular reservoir being in fluid communication with the first named reservoir and disposed to replenish same.

6. A switch comprising a body member having a hollow cylindrical interior forming a sealed reservoir having a variable volumetric capacity and adapted to hold a predetermined quantity of mercury substantially less than the maximum of said capacity, a pair of spaced electrodes carried by said means to dispose an end of each to conduct electricity therebetween via said mercury when the volumetric capacity of the reservoir is reduced, and a plunger movable between retracted and advanced positions within said interior for temporarily reducing the volumetric capacity of the reservoir to force said mercury into contact with both said electrodes, and resilient mechanical means serving to positively hold said plunger in each of said positions, the last named means including a resilient bell-shaped member engaging both said plunger and body member to include an S-shaped portion therebetween adapted to develop a folded-over lobe portion having a reverse curve serving to retain said plunger in each of two positions.

7. A switch comprising means forming a sealed reservoir having a variable volume and adapted to hold a predetermined volume of mercury, said means including a body member having a hollow cylindrical interior, a pair of spaced electrodes carried by said means to dispose an end of each to conduct electricity therebetween via said mercury when the volume of the reservoir is reduced, and a plunger movable between advanced and retracted positions within said interior for temporarily reducing the volume of the reservoir to force said mercury into contact with both said electrodes, means serving to positively hold said plunger in each of said positions, the last named means including a hollow, resilient member formed to include a bell-shaped portion having a large opening at one end adapted to receive and engage said body member, said resilient member including a neck portion at the other end having a smaller opening adapted to receive and engage said plunger, said neck and bell-shaped portions merging into each other, the degree of resilience of the last named member serving to permit one end of the resilient member to be moved toward the other and form a folded-over lobe portion having a reverse curve configuration serving to retain said ends in a stable proximate relation, the ends of said resilient member being respectively secured to the plunger and body member against relative axial movement therealong, thereby providing a bi-stable plunger actuated mercury controlled switch.

8. A switching device comprising a body member having a hollow cylindrical interior forming a reservoir adapted to hold a deposit of mercury, a plurality of electrodes carried by the body member, one end of each electrode being disposed in a predetermined spiral path around the interior of said body member and exposed to permit contact with fluid in the interior of the body member, a plunger snugly received by said body member and threadedly engaged to be screwed between advanced and retracted positions in the reservoir formed in said body member to displace mercury from the reservoir, a port defined in the plunger and disposed to follow said spiral path, means defining a temporary holding chamber serving to receive mercury displaced from the reservoir by advancing movement of the plunger, a fluid path extending between said reservoir and said port and connected to subject the port to a liquid pressure head from said temporary holding chamber with said port in fluid contact with any of said electrodes, and a common electrode disposed to remain in continuous electrical contact with mercury in said reservoir whereby spiral movement of said plunger serves to electrically interconnect the last named electrode selectively to any one of the first named electrodes via mercury in said reservoir and said fluid path, according to rotary and axial displacement of the plunger.

9. A switching device as defined in claim 8 wherein the ends of the first named electrodes lying in the spiral path are each disposed in a recess adapted to retain a protective deposit of mercury therein to provide mercury to mercury contact therewith in completing an electrical path between a selected one of the plurality of electrodes and said common electrode.

10. A switching device comprising a body member of insulating material having a hollow cylindrical interior, a core member disposed to rotate coaxially in said interior, a pair of electrodes disposed with an end of each in fluid communication with said interior, a third electrode disposed with an end thereof, in fluid communication with the interior of said body member and disposed to be interconnected electrically to one or the other of said pair of electrodes, an opening formed in said core member defining, in one rotational disposition of said core member with respect to said body member, a fluid path extending between said third electrode and one of said pair of electrodes, and in a second rotational disposition of said core member with respect to said body member, defining a fluid path extending between said third electrode and the other said pair of electrodes, said opening being adapted to be filled with mercury for making electrical interconnections between said electrodes, the ends of the first named electrodes being disposed in a recess adapted to submerge same in a protective deposit of mercury therein to provide mercury to mercury contact therewith between said common electrode and one or the other of said pair of electrodes, and further including an annular reservoir extending around the core member and formed between the core member and the body member, and adapted to continuously retain mercury therein to form a fluid seal between said interior and the surrounds, said annular reservoir being in fluid communication with the recesses during each of said rotational disposition of said core member with respect to said body member to apply a liquid pressure head thereto during said dispositions.

References Cited
UNITED STATES PATENTS

| | | | |
|---|---|---|---|
| 1,461,101 | 7/1923 | Stearns | 200—32 |
| 1,845,234 | 2/1932 | Butler et al. | 200—152 X |
| 1,979,441 | 11/1934 | Benya | 200—152 X |
| 1,983,150 | 12/1934 | Sigman | 200—32 X |
| 2,249,738 | 7/1941 | Brownfield | 200—152 X |
| 2,486,785 | 11/1949 | Hutcheon | 200—152 |
| 2,606,256 | 8/1952 | Sissenwine | 200—152 X |
| 2,980,778 | 4/1961 | Hunciker | 200—112 |
| 3,133,998 | 5/1964 | Horowitz | 200—97 X |
| 3,184,693 | 5/1965 | Lanctot | 200—152 X |

ROBERT K. SCHAEFER, *Primary Examiner.*

H. HOHAUSER, *Assistant Examiner.*